United States Patent Office 2,840,604
Patented June 24, 1958

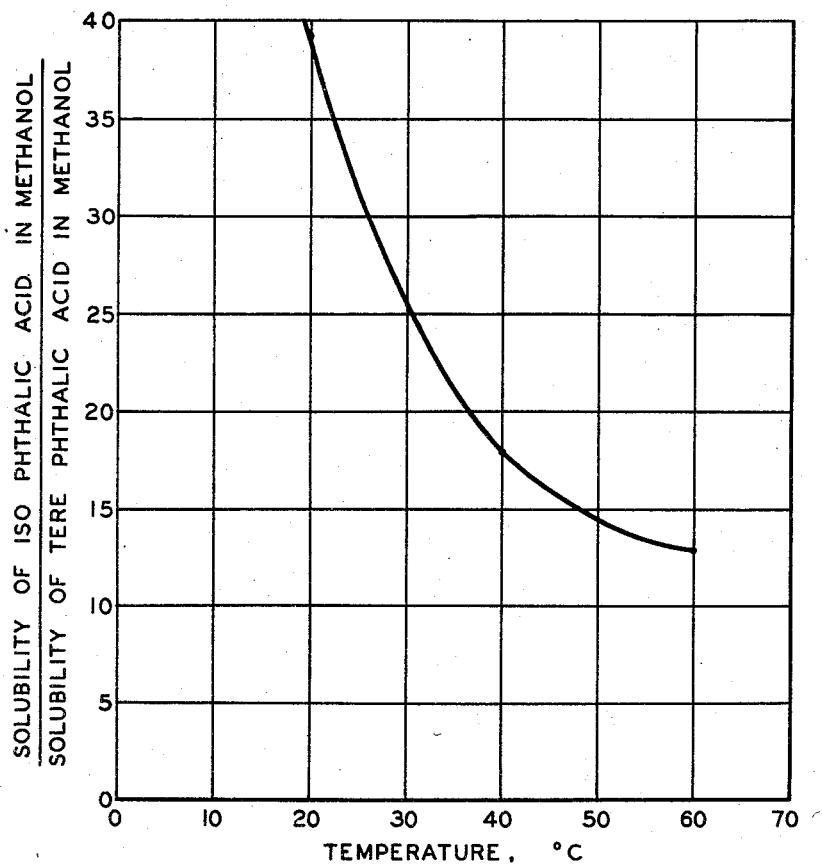

2,840,604

SEPARATION OF AROMATIC ACIDS

George C. Feighner and Adolph C. Shotts, Ponca City, Okla., assignors to Continental Oil Company, Ponca City, Okla., a corporation of Delaware Application May 2, 1955, Serial No. 505,359

5 Claims. (Cl. 260—525)

This invention relates to a process for separating a mixture of benzene dicarboxylic acids and benzoic acids into its components. More particularly this invention provides a method of separating parabenzene dicarboxylic acid, commonly called terephthalic acid, from benzoic acid and metabenzene dicarboxylic acid, commonly called isophthalic acid.

The separation of a mixture of benzene dicarboxylic acids into meta and para isomers is troublesome. The ortho isomer is readily separated from the meta and para isomers since the ortho isomer alone forms an anhydride. The usual physical and chemical means of separation, however, are not effective for separating isophthalic from terephthalic acid because of their similar properties. Heretofore one method of separating these two acids has involved forming the alkyl esters of the acids fractionating the esters and saponifying the ester. Ordinarily the dimethyl esters are used to effect separation in this manner. Another method for separating these two acids has been suggested in the prior art involving the non-catalytic esterification of the mixture of two acids with an alcohol. Isophthalic acid under such conditions reacts with the alcohol to form an ester, whereas terephthalic acid does not esterify under those conditions. Following the reaction and cooling the reaction mixture terephthalic acid precipitates therefrom and is separated from the reaction mixture by filtration. Such a method is effective for separating these two acids, however, if isophthalic acid is the desired product, the ester, of course, must be saponified.

Accordingly it is an object of this invention to provide a process for separating mixtures of terephthalic acid, isophthalic acid and benzoic acid from a mixture thereof, which method obviates the disadvantages of the prior art processes. Another object of our invention is to provide a method for the separation of these acids which does not involve esterification. It is yet another object of the present invention to provide a method for the separation of terephthalic acid, isophthalic acid and benzoic acid from the products of oxidation of a mixture of paraxylene, methaxylene and ethylbenzene. Other objects and advantages of this invention will become apparent to those skilled in the art from the following detailed description.

In brief, the foregoing objects and advantages are obtained by a process which comprises the extraction of a mixture of terephthalic, isophthalic and benzoic acids with a selective solvent in which the terephthalic acid is relatively insoluble and in which benzoic acid is more soluble than is isophthalic acid. Extracting the mixture of the three acids with such a solvent will dissolve the isophthalic and benzoic acids. After separating the dissolved acids from the insoluble terephthalic acids the isophthalic acid may be recovered from the solution of benzoic and isophthalic acids by evaporating a portion of the selective solvent. Since the isophthalic acid is not very soluble in the selective solvent, the isophthalic acid will precipitate out when very much of the solvent has been evaporated. The isophthalic acid can be separated from the benzoic acid by filtration.

Somewhat more specifically the present invention provides a method by which relatively pure terephthalic, isophthalic and benzoic acids may be recovered from the oxidation products of paraxylene, metaxylene and ethyl benzene. Generally such mixtures will contain from about .1 to .5 part of benzoic acid and from 1 to 3.5 parts of isophthalic acid per part of terephthalic acid. A suitable amount of the selective solvent may vary from about 35 to 350 parts per part of isophthalic acid. Quantities of solvent in excess of 350 parts may be used but no particular advantage is attained thereby. Suitable solvents are stable inert volatile organic liquids having a dissolving power for the isophthalic acid which is about 10 to 150 times as great as for terephthalic acid. Specific solvents include the lower aliphatic alcohols, ketones and carboxylic acids, as for example, methanol, ethanol, normal propanol, isopropanol, tertiary butanol, acetone, methyl ethyl ketone, diethyl ketone, methyl isobutyl ketone, formic acid and dioxane and tetrahydrofurane. Mixtures of two or more of the above-named solvents may be used also. Alternatively and somewhat preferably the initial extraction is carried out with one solvent and the final extraction with a second solvent. As for example, benzoic acid may be extracted from the mixture of the three acids by using as a solvent benzene acetic acid or toluene which will dissolve out the benzoic acid and not extract either of the phthalic acid isomers. The terephthalic and isophthalic acid may then be separated by extracting the extrahend with methanol or ethanol preferably at a temperature of about 20–25° C. Temperatures higher than 20 to 25° C. may be used with an overall reduction in the quantity of solvent required. Such a result is accomplished, however, at a sacrifice in selectivity of the solvent for the two phthalic acids, hence our preferred temperature range. That is, the higher the temperature, 50° C. and above, the less solvent required but the separation of the two acids will not be as sharp and each of the acids so recovered will contain a greater quantity of the other acid than if the extraction were conducted at the lower temperature. This result is apparent from the accompanying drawing wherein the selectivity of methanol for the two acids is plotted versus temperature. Similar curves were obtained using the other aliphatic alcohols, ketones and carboxylic acids listed above.

In order to disclose the nature of the present invention still more clearly, the following illustrative examples will be given. It is to be understood that the invention is not to be limited to the specific conditions or details set forth in these examples except insofar as such limitations are specified in the appended claims. In the examples, parts given are parts by weight.

*Example 1*

A reactor was charged with 20 parts of a refinery stream analyzing 18.6% ethylbenzene, 65.3% m-xylene and 16.2% p-xylene, 250 parts of water, and 5 parts of potassium hydroxide. While the mixture was being agitated and heated to reflux (93–95° C.) there was added over a period of 3 hours 110 parts of potassium permanganate. Following the addition of the permanganate the mixture was heated at reflux for an additional hour. After acidifying the mixture, 5.7 parts of unreacted hydrocarbon and 18.6 parts of solid acids analyzing 63% isophthalic acid, 35% terephthalic acid and 2% benzoic acid were recovered; the latter recovered from the aqueous phase.

*Example 2*

The acid mixture obtained in Example 1 was treated with 760 parts of ethanol at 20° C. On filtering there was obtained 6 parts of pure terephthalic acid. The filtrate was concentrated to 14 parts and filtered whereon 11.8 parts of isophthalic acid containing about 3% terephthalic acid. Concentration of the filtrate yielded 0.5 part of impure benzoic acid.

Example 3

Ten parts of a mixture of acids containing 59.2% isophthalic acid, 30.2% terephthalic acid and 10.6% benzoic acid was extracted with five 65 part portions of methanol at 25° C. The extrahend consisted of 3 parts of pure terephthalic acid. The extract was distilled to concentrate the remaining acids and recover methanol. When a thick slurry was obtained in the still pot, the material was cooled and press filtered. There was obtained 5.9 parts of isophthalic acid analyzing 96.7% isophthalic acid. Concentration of the filtrate yielded about 1 part of a mixture of acids that was primarily benzoic.

Example 4

Ten parts of the acid mixture used in Example 3 was wet with 3.5 parts of methanol. The mixture was press filtered yielding an extract which on concentration gave about 1 part of crude benzoic acid. The extrahend was extracted with five 65 part portions of methanol at 25° C. On concentration of the combined extracts about 6 parts of isophthalic acid was obtained. The remaining extrahend consisted of almost pure terephthalic acid.

Example 5

Ten parts of an acid mixture as used in Example 3 was extracted with three 200 part portions and then three 100 part portions of acetone at 25° C. The extrahend consisted of about 3 parts of terephthalic acid. The extract was distilled to concentrate the remaining acids. From the concentrate in the still was obtained 6.0 parts of isophthalic acid by filtration. On evaporation of the filtrate a mixture of acids that was primarily benzoic was obtained.

Example 6

Ten parts of an acid mixture such as used in Example 3 was extracted with three portions of 10 parts each of benzene. The combined extracts yielded about 1 part of relatively pure benzoic acid. The extrahend was then extracted with five 65 part portions of methanol. On concentration of the combined extracts about 5.9 parts of relatively pure isophthalic acid was obtained. The second extrahend consisted of almost pure terephthalic acid.

A repeat experiment in which benzene was replaced by acetic acid gave similar results.

Example 7

Ten parts of a product of hydrocarbon oxidation analyzing 51.2% isophthalic acid, 22.5% terephthalic acid, 15.7% toluic acids and 10.6% benzoic acids was extracted with four 100 part portions of methanol. An extrahend of 2.2 parts of relatively pure terephthalic acid was obtained. The extract was concentrated to about 22 parts and press filtered. A second extrahend of about 5 parts of relatively pure isophthalic acid was obtained. From the filtrate 2.8 parts of a mixture of acids primarily benzoic and toluic acids was obtained.

While particular embodiments of the invention have been described, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. A process for the separation of a mixture of aromatic acids comprising per part of terephthalic acid in said mixture, 1 to 3.5 parts isophthalic acid, and .1 to .5 part benzoic acid, which comprises removing the benzoic acid from said mixture by extracting said mixture with about 3 parts acetic acid per part of said acid mixture, to form an extract comprising benzoic acid dissolved in said acetic acid, and an extrahend comprising isophthalic acid and terephthalic acid, then extracting the extrahend with about 35 to 350 parts of a solvent per part of said isophthalic acid selected from the group consisting of aliphatic alcohols having from 1 to 5 carbon atoms and ketones having from 3 to 5 carbon atoms, per part of isophthalic acid to form an extrahend comprising relatively pure terephthalic acid and an extract comprising isophthalic acid dissolved in said solvent, both extractions being carried out at a temperature of from 20 to 25° C., then concentrating the extracts, and filtering said concentrated extracts to remove the isophthalic acid, and benzoic acid from their respective solvents.

2. The process of claim 1 wherein the benzoic acid is extracted with about 3 to 10 parts of acetic acid per part of isophthalic acid in the mixture.

3. The process of claim 1 wherein the second mentioned solvent is acetone.

4. The process of claim 1 wherein the second mentioned solvent is methanol.

5. The process of claim 1 wherein the second mentioned solvent is ethanol.

References Cited in the file of this patent

UNITED STATES PATENTS 2,741,633     McKinnis et al. _____ Apr. 10, 1956

FOREIGN PATENTS 329,375     Great Britain _____ May 19, 1930

OTHER REFERENCES

Fittig et al.: Liebigs Ann., vol. 148, pp. 11–23 (1868).
Bonz: Ber. Deut. Chem., vol. 18, p. 2305 (1885).
Ullman et al.: Ber. Deut. Chem., vol. 36, p. 1798 (1903).
McMaster: Am. Chem. J., vol. 49, 298 (1913).
Heilbron: Dictionary of Organic Compounds, vol. 1, p. 255, vol. III, p. 104, and vol. IV, p. 404 (1953).